(12) United States Patent
Li et al.

(10) Patent No.: US 6,343,176 B1
(45) Date of Patent: Jan. 29, 2002

(54) LONG HAUL SINGLE MODE WAVEGUIDE

(75) Inventors: Ming-Jun Li, Horseheads; Jeffery Scott Stone, Addison, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/361,905

(22) Filed: Jul. 27, 1999

Related U.S. Application Data
(60) Provisional application No. 60/094,996, filed on Jul. 31, 1998, provisional application No. 60/105,310, filed on Oct. 23, 1998, and provisional application No. 60/106,332, filed on Oct. 30, 1998.

(51) Int. Cl.[7] ................................................ G02B 6/22
(52) U.S. Cl. ........................ 385/127; 385/124; 385/126
(58) Field of Search ................................ 385/124, 126, 385/127

(56) References Cited

U.S. PATENT DOCUMENTS

| | | | |
|---|---|---|---|
| 4,715,679 A | | 12/1987 | Bhagavatula |
| 5,553,185 A | * | 9/1996 | Antos et al. ................ 385/127 |
| 5,559,921 A | | 9/1996 | Terasawa et al. |
| 5,649,044 A | | 7/1997 | Bhagaratula |
| 5,684,909 A | * | 11/1997 | Liu ............................ 385/127 |
| 5,721,800 A | | 2/1998 | Kato et al. |
| 5,748,824 A | | 5/1998 | Smith ......................... 385/124 |
| 5,781,684 A | | 7/1998 | Liu ............................ 385/124 |
| 5,802,235 A | * | 9/1998 | Akasaka ..................... 385/123 |
| 5,835,655 A | * | 11/1998 | Liu et al. .................... 385/124 |
| 5,852,701 A | | 12/1998 | Kato et al. .................. 385/127 |
| 5,894,537 A | | 4/1999 | Berkey et al. .............. 385/123 |
| 5,999,679 A | * | 12/1999 | Antos et al. ................ 385/127 |
| 6,031,956 A | * | 2/2000 | Li et al. ..................... 385/124 |
| 6,072,929 A | | 6/2000 | Kato et al. .................. 385/123 |
| 6,134,367 A | * | 10/2000 | Jones et al. ................. 385/124 |

FOREIGN PATENT DOCUMENTS

| | | |
|---|---|---|
| EP | 0 689 068 A1 | 12/1995 |
| EP | 0724171 | 7/1996 |
| EP | 0 775 924 A2 | 5/1997 |
| EP | 0 775 924 A3 | 5/1997 |
| EP | 775924 | 5/1997 |
| EP | 0 785 448 A1 | 7/1997 |
| EP | 0789255 | 8/1997 |
| EP | 0 859 247 A3 | 8/1998 |
| EP | 0 859 247 A2 | 8/1998 |
| EP | 0859247 | 8/1998 |
| EP | 0902307 | 3/1999 |

* cited by examiner

*Primary Examiner*—Rodney Bovernick
*Assistant Examiner*—Sarah N Song
(74) *Attorney, Agent, or Firm*—William J. Chervenak

(57) ABSTRACT

Disclosed is a single mode optical waveguide fiber having a segmented core. The relative indexes, the refractive index profiles and the radii of the segments are chosen to provide waveguide fiber properties advantageously used in severe environments, such as, undersea cables. The segmented core waveguide fiber has a negative total dispersion over the operating window of about 1530 nm to 1570 nm, which serves to eliminate soliton formation. The key properties of dispersion zero, cut off wavelength, attenuation, and bend resistance fall within desired ranges. The waveguide also features a low polarization mode dispersion.

21 Claims, 4 Drawing Sheets

LONG HAUL SINGLE MODE WAVEGUIDE

CROSS-REFERENCE TO RELATED APPLICATIONS

This application claims the benefit of U.S. Provisional Application Serial No. 60/094,996 filed Jul. 31, 1998, U.S. Provisional Application Serial No. 60/105,310, filed Oct. 23, 1998 and U.S. Provisional Application Serial No. 60/106,332, filed Oct. 30, 1998.

BACKGROUND OF THE INVENTION

The invention is directed to a single mode optical waveguide fiber designed for long repeater spacing, high data rate telecommunication systems. In particular, the single mode waveguide combines excellent bend resistance, low attenuation, and large effective area, $A_{eff}$, features that are desired for undersea applications.

A waveguide having large effective area reduces non-linear optical effects, including self phase modulation, four wave mixing, cross phase modulation, and non-linear scattering processes, all of which can cause degradation of signals in high power systems. In general, a mathematical description of these non-linear effects includes the ratio, $P/A_{eff}$, where P is optical power. For example, a non-linear optical effect can be described by an equation containing a term, $\exp[P \times L_{eff}/A_{eff}]$, where $L_{eff}$ is effective length. Thus, an increase in $A_{eff}$ produces a decrease in the non-linear contribution to the degradation of a light signal.

The requirement in the telecommunication industry for greater information capacity over long distances, without electronic signal regeneration, has led to a reevaluation of single mode fiber index profile design. The genera of these profile designs, which are called segmented core designs in this application, are disclosed in detail in U.S. Pat. No. 4,715,679, Bhagavatula.

The focus of this reevaluation has been to provide optical waveguides which:
  reduce non-linear effects such as those noted above;
  are optimized for the lower attenuation operating wavelength range around 1550 nm;
  are compatible with optical amplifiers; and,
  retain the desirable properties of optical waveguides such as high strength, fatigue resistance, and bend resistance.

The definition of high power and long distance is meaningful only in the context of a particular telecommunication system wherein a bit rate, a bit error rate, a multiplexing scheme, and perhaps optical amplifiers are specified. There are additional factors, known to those skilled in the art, which have impact upon the meaning of high power and long distance. However, for most purposes, high power is an optical power greater than about 10 mw. In some applications, signal power levels of 1 mW or less are still sensitive to non-linear effects, so that $A_{eff}$ is still an important consideration in such lower power systems.

A long distance is one in which the distance between electronic regenerators can be in excess of 100 km. The regenerators are to be distinguished from repeaters which make use of optical amplifiers. Repeater spacing, especially in high data density systems, can be less than half the regenerator spacing.

To provide a suitable waveguide for multiplexed transmission, the total dispersion should be low, but not zero, and have a low slope over the window of operating wavelength. In systems in which the suppression of potential soliton formation is important, the total dispersion of the waveguide fiber should be negative, so that the linear dispersion cannot counteract the non-linear self phase modulation which occurs for high power signals.

A typical application for such a waveguide fiber is undersea systems that, in order to be economically feasible, must carry high information rates over long distances without regenerators and over an extended window of wavelengths. The present invention describes a novel profile that is singularly suited to for use in these stringent conditions. The desired properties of the waveguide fiber for such a system are set forth in detail below.

Definitions

The following definitions are in accord with common usage in the art.

The radii of the segments of the core are defined in terms of the index of refraction. A particular segment has a first and a last refractive index point. The radius from the waveguide centerline to the location of this first refractive index point is the inner radius of the core region or segment. Likewise, the radius from the waveguide centerline to the location of the last refractive index point is the outer radius of the core segment.

The segment radius may be conveniently defined in a number of ways, as will be seen in the description of FIGS. 1 & 2 below. In the case of FIG. 2, from which Tables 1 & 2 are derived, the radii of the index profile segments are defined as follows, where the reference is to a chart of $\Delta \%$ vs. waveguide radius:

the radius of the central core segment, $r_1$, is measured from the axial centerline of the waveguide to the intersection of the extrapolated central index profile with the x axis, i.e., the $\Delta \%=0$ point;
  the outer radius, $r_2$, of the first annular segment is measured from the axial centerline of the waveguide to the intersection of the first annular segment profile with a vertical line drawn through the $\Delta \%$ point which is half of the $\Delta \%$ difference between the first and the second annular segment profile;
  the outer radius, $r_3$, of the second annular segment is measured from the axial centerline of the waveguide to the intersection of the second annular segment profile with a vertical line drawn through the $\Delta \%$ point which is half of the $\Delta \%$ difference between the second and third annular segment profile;
  the outer radius of any additional annular segments is measured analogously to the outer radii of the first and second annular segments; and,
  the radius of the final annular segment is measured from the waveguide centerline to the midpoint of the segment.

The width, w, of a segment is taken to be the distance between the inner and outer radius of the segment. It is understood that the outer radius of a segment corresponds to the inner radius of the next segment.

No particular significance is attached to a particular definition of index profile geometry. Of course, in carrying out a model calculation the definitions must be used consistently as is done herein.

The effective area is
  $A_{eff}=2\pi(\int E^2 \, r \, dr)^2/(\int E^4 \, r \, dr)$, where the integration limits are 0 to $\infty$, and E is the electric field associated with the propagated light. The effective area is wavelength dependent. The wavelength at which the effective area is calculated is the wavelength at or near the center of the operating window for which the waveguide fiber is designed. More than one $A_{eff}$ may be assigned to a waveguide fiber which operates over a range of the order of hundreds of nanometers.

Effective diameter, $D_{eff}$, may be defined as, $A_{eff}=\pi(D_{eff}/2)^2$.

The relative index, $\Delta$ %, is defined by the equation, $\Delta\% = 100 \times (n_1^2 - n_2^2)/2n_1^2$, where $n_1$ is the maximum refractive index of the index profile segment 1, and $n_2$ is a reference refractive index which is taken to be, in this application, the refractive index of the clad layer.

The term refractive index profile or simply index profile is the relation between $\Delta$ % or refractive index and radius over a selected portion of the core.

The term $\alpha$-profile refers to a refractive index profile expressed in terms of $\Delta(b)$ %, where b is radius, which follows the equation, $\Delta(b)\% = \Delta(b_0)(1-[|b-b_0|/(b_1-b_0)]^\alpha)$, where $b_0$ is the radial point at which the index is a maximum and $b_1$ is the point at which $\Delta(b)\%$ is zero and b is in the range $b_i \leq b \leq b_f$, where delta is defined above, $b_i$ is the initial point of the $\alpha$-profile, $b_f$ is the final point of the $\alpha$-profile, and $\alpha$ is an exponent which is a real number.

Other index profiles include a step index, a trapezoidal index and a rounded step index, in which the rounding is typically due to dopant diffusion in regions of rapid refractive index change.

Total dispersion is defined as the algebraic sum of waveguide dispersion and material dispersion. Total dispersion is sometimes called chromatic dispersion in the art. The units of total dispersion are ps/nm-km.

The bend resistance of a waveguide fiber is expressed as induced attenuation under prescribed test conditions. Standard test conditions include 100 turns of waveguide fiber around a 75 mm diameter mandrel and 1 turn of waveguide fiber around a 32 mm diameter mandrel. In each test condition the bend induced attenuation, usually in units of dB/(unit length), is measured. In the present application, the bend test used is 5 turns of the waveguide fiber around a 20 mm diameter mandrel, a more demanding test which is required for the more severe operating environment of the present waveguide fiber.

SUMMARY OF THE INVENTION

The novel single mode waveguide fiber of this application meets the high performance telecommunication system requirements set forth herein.

A first aspect of the invention is a single mode optical waveguide fiber having a segmented core of at least two segments, surrounded by a cladding glass layer. The waveguide fiber has an effective area greater than 60 $\mu m^2$, and preferably greater than 65 $\mu m^2$, over the wavelength range of about 1530 nm to 1570 nm, attenuation at 1550 nm less than 0.25 dB/km and preferably less than 0.22 dB/km, a zero dispersion wavelength in the range of about 1565 nm to 1600 nm, a dispersion slope which provides a dispersion at 1560 nm more negative than about −0.5 ps/nm-km and a preferred 1560 dispersion about −2 ps/nm-km. Typically the slope is in the range of about 0.10 to 0.14 ps/nm2-km. The total dispersion of the waveguide fiber is in the range of about −7.2 to −3.9 ps/nm-km at 1530 nm. The mode field diameter is in the range of about 7.9 to 9.75 $\mu$m over the 1530 nm to 1570 nm wavelength range.

These properties are achieved while maintaining good bend resistance, i.e., an induced bend loss no greater than about 5 dB/m, for 5 turns about a 20 mm mandrel. Also, cut off wavelength of fiber in cabled form is held in the range of about 1285 nm to 1500 nm. An added benefit is a polarization mode dispersion less than about 0.076 ps/(km)$^{12}$, and typically about 0.04 ps/(km)$^{12}$.

The index profiles of the respective segments can be any of those defined above, including an $\alpha$-profile, a step index profile, or a trapezoidal profile. Unless special steps are inserted in the process, the refractive index profiles will be rounded at points where the refractive index changes sharply. The rounding is due to diffusion of the dopant materials used to change the base glass refractive index. Thus any of these index profiles may be rounded at particular points. For example, a step index profile, having a positive $\Delta$ % will typically have rounded upper and lower corners.

In one embodiment of the invention, the core segments all have a positive $\Delta$ %. In another embodiment, the core comprises three segments, the first being an $\alpha$-profile, the second a step profile and the third a rounded step profile. Examples of this embodiment are set forth in Table 1 below.

In another embodiment of the invention, the core region comprises three segments and the center has been compensated for dopant diffusion so that the refractive index on or near the waveguide fiber centerline is not reduced relative to the remainder of the center profile. An example of such centerline compensation is shown in FIG. 3 wherethe dopant is germanium. The diffusion compensated embodiment shows an average improvement in polarization mode dispersion of about a factor of 5 relative to a comparable uncompensated waveguide fiber profile. The polarization mode dispersion of the novel waveguide fiber is less than 0.08 ps/(km)$^{1/2}$ and typically less than about 0.04 ps/(km)$^{1/2}$. In a three segment embodiment, numbering the segments starting with 1 at the waveguide center, the segmented core is described by the parameters:

$\Delta_1$ % in the range of about 0.75 to 1.25;

$r_1$ in the range of about 1.5 to 4.0 $\mu$m;

$\Delta_2$ % in the range of about 0.00 to 0.15%;

$\Delta_3$ % in the range of about 0.2 to 0.7;

mid point radius $r_3$ in the range of about 4 to 8 $\mu$m; and, width of the third segment in the range of about 0.5 to 3 $\mu$m.

A preferred range is:

$\Delta_1$ % in the range of about 0.85 to 1.20;

$r_1$ in the range of about 2.0 to 3.5 $\mu$m;

$\Delta_2$ % in the range of about 0.00 to 0.08%;

$\Delta_3$ % in the range of about 0.3 to 0.7;

mid point radius $r_3$ in the range of about 5 to 7.5 $\mu$m; and, width of the third segment in the range of about 0.8 to 2.0 $\mu$m.

A more preferred embodiment is:

$\Delta_1$ % in the range of about 0.95 to 1.15;

$r_1$ in the range of about 2.5 to 3.0 $\mu$m;

$\Delta_2$ % in the range of about 0.00 to 0.04%;

$\Delta_3$ % in the range of about 0.3 to 0.7;

mid point radius $r_3$ in the range of about 5 to 7.5 $\mu$m; and, width of the third segment in the range of about 0.8 to 1.5 $\mu$m.

In another embodiment the total dispersion at 1560 nm is more negative than about −1 ps/nm-km.

In yet another embodiment, centerline diffusion is either uncompensated or partially compensated so that there is an indentation of refractive index on centerline having a minimum $\Delta$ % not less than about 0.20 of $\Delta_1$ %. The indentation is typically of the shape of an inverted cone, i.e., the apex of the cone points downward, and the radius at the widest part of the cone is no greater than about 0.4 µm.

DETAILED DESCRIPTION OF THE INVENTION

The novel single mode optical waveguide is characterized by its segmented core design that provides the unusual combination of properties set forth above. These properties are achieved by selecting a proper refractive index profile shape of each of the segments and selecting the appropriate relative refractive index delta, $\Delta_i$ %, and radial extent, $r_i$, of the segments. The profile parameters are known to interact. For example, a center region α-profile having an α of about 1, will have a radius different from a center region having a trapezoidal index to provide fibers having essentially identical properties.

Figure 2:
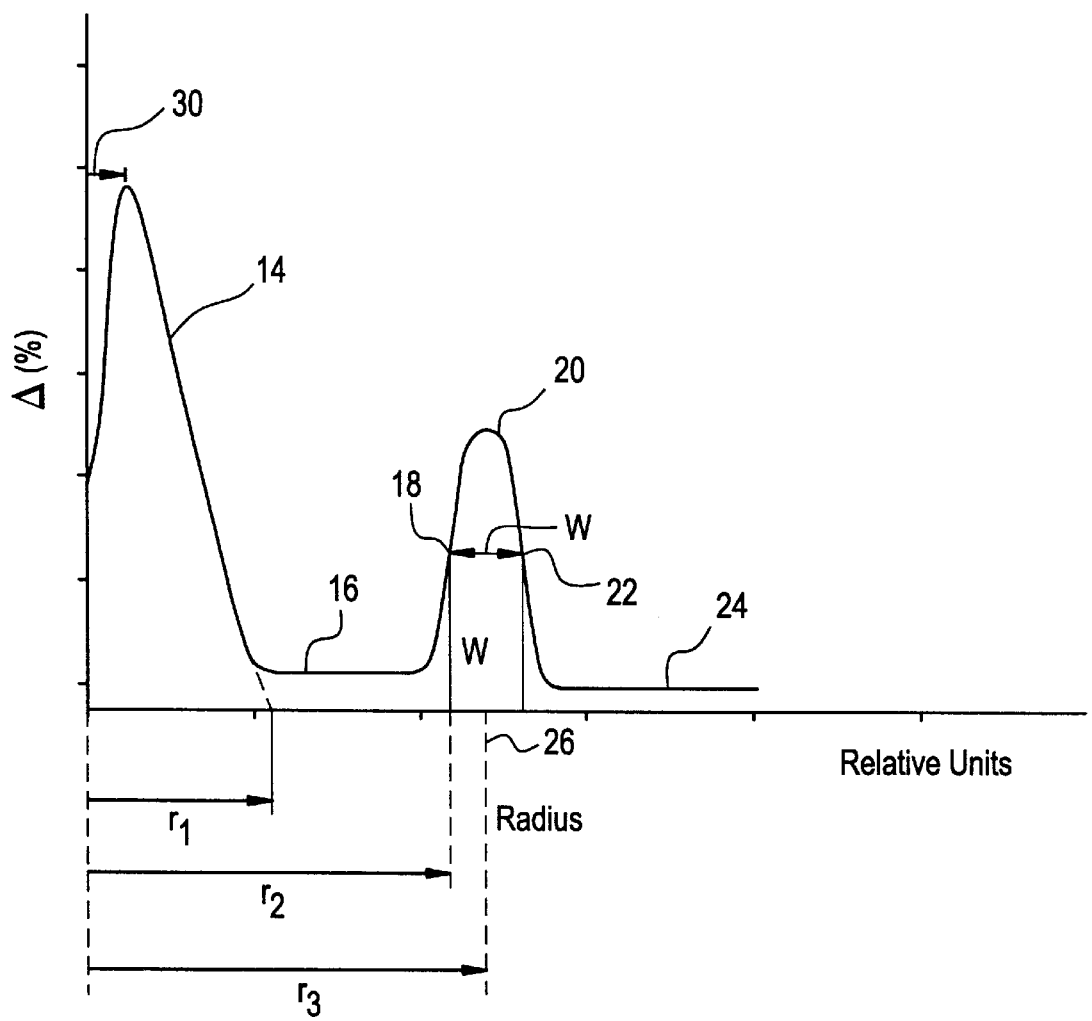
FIG. 2 is a Δ % vs. radius chart showing the definitions of radius and width used in this application.

The definitions of radius used herein are shown in FIG. 2. The radius of the central segment is shown by line $r_1$ drawn from the core centerline to the intersection of extrapolated line 14 with the horizontal axis. The outer radius of segment 16 is line $r_2$ drawn from the centerline to the vertical line descending from the point 18 which marks the point where the relative index is half the difference between $\Delta_2$ %, the relative index of segment 16, and $\Delta_3$ %, the relative index of segment 20. The radius $r_3$ of the final annular segment 20 is draw to the center point 26 of that segment. The geometry is fully specified when the width w of the final segment is selected. This width is shown as line w that lies between points 18 and 22, the respective points of half index differences between segments 16 and 20, and segment 20 and clad 24. The radius of the centerline indentation is shown as line 30 drawn horizontally from the centerline at the widest point of the inverted cone indentation.

Figure 1A:
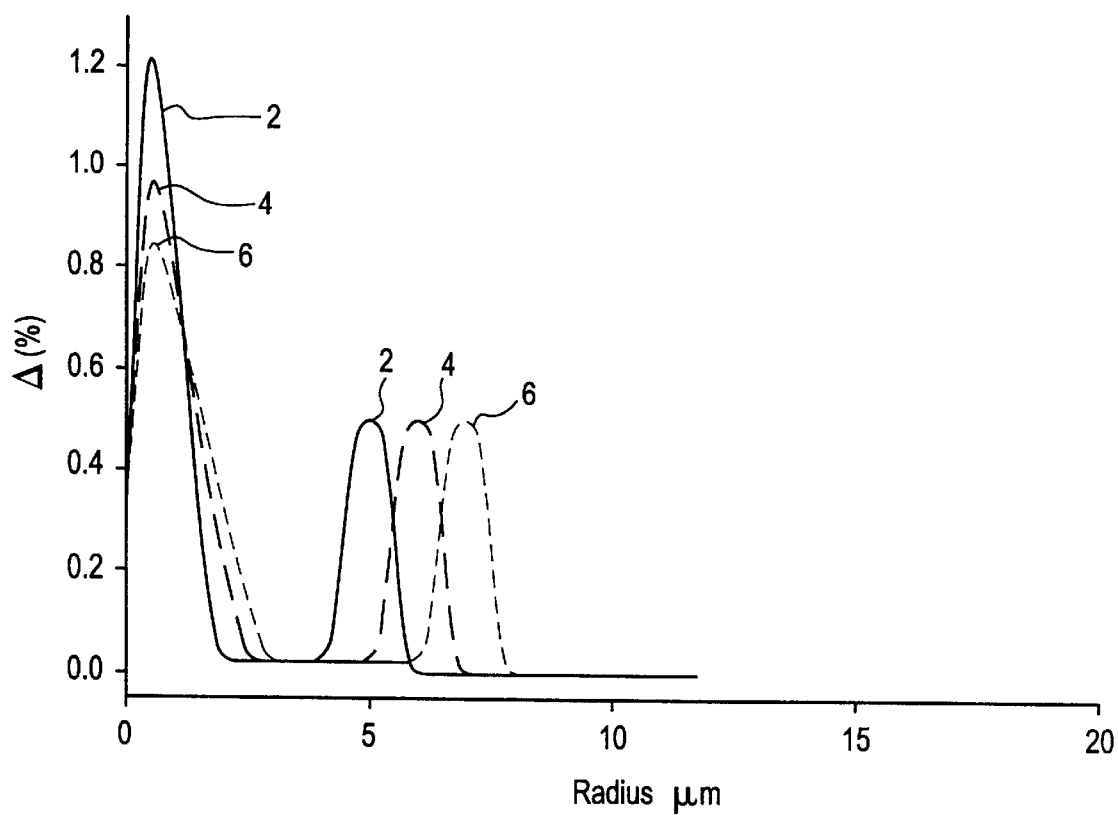
FIGS. 1*a* & *b* are charts of Δ % vs. radius each illustrating a modeled index profile similar to that of the invention.
Figure 1B:
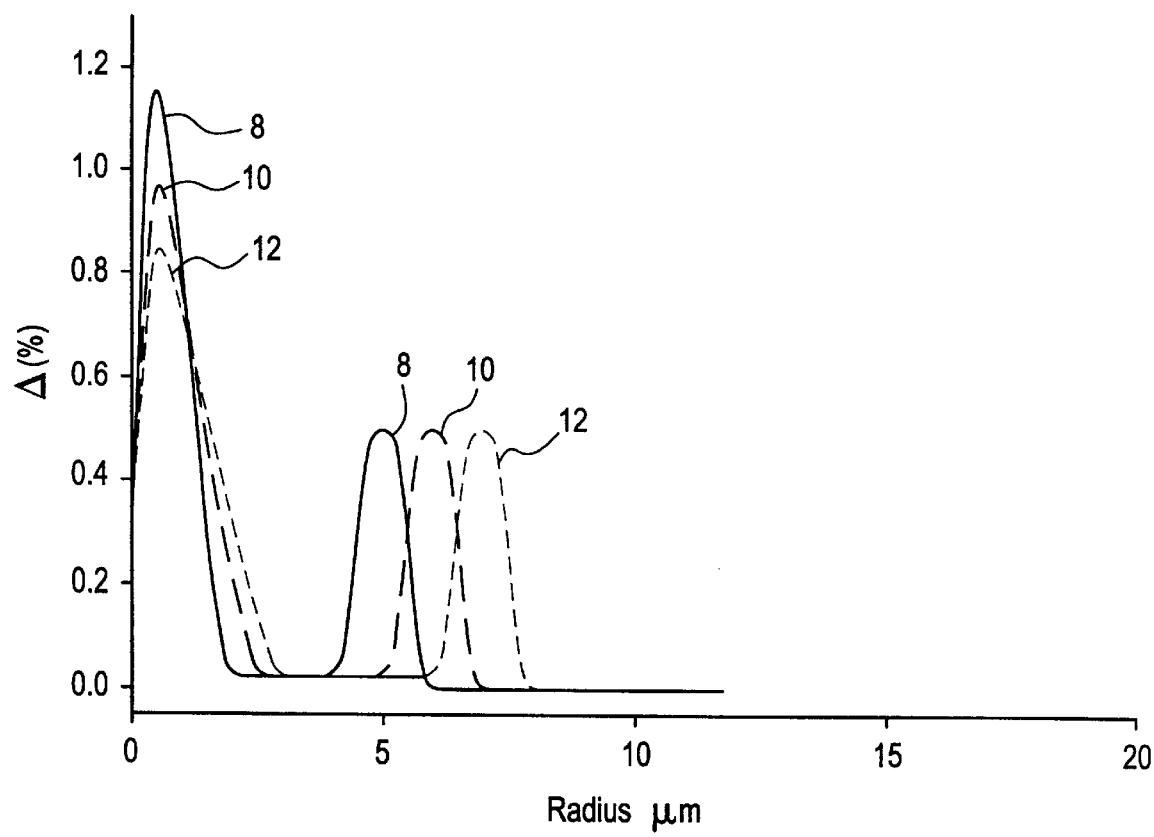

Three computer generated profiles, 2, 4, and 6, are shown in FIG. 1*a*. The center segments and the associated outer annular segments have corresponding numbers for purposes of clarity. Each profile has an inverted cone indentation on centerline. Given the overall shape of the segmented core index profile, the properties of a waveguide fiber having that segmented core shape may be calculated. In the case of FIG. 1*a*, profile 4 provides the desired fiber characteristics. FIG. 1*b* shows three additional segmented core profiles, 8, 10, and 12. In this illustration, profile 10 yields the desired fiber properties.

Figure 3:
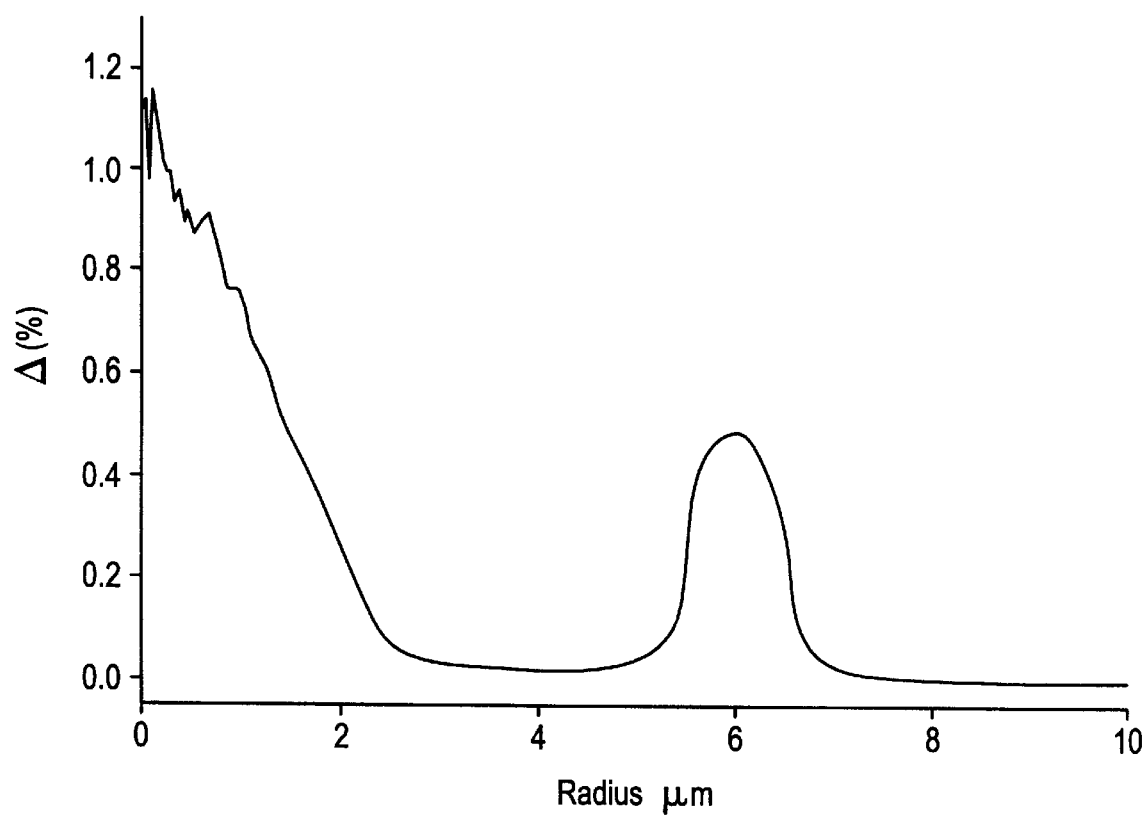
FIG. 3 is a chart of Δ % vs. radius showing an embodiment of the invention.

The profile shown in FIG. 3 is a measured profile of a waveguide fiber having a refractive index profile in accord with the invention. Table 1 gives the core index profile parameters for this embodiment. The centerline diffusion is compensated in this design.

TABLE 1

|  | Actual Profile |
| --- | --- |
| $\Delta_1$ % | 1.15 |
| Δ % on centerline | 0 |

TABLE 1-continued

|  | Actual Profile |
| --- | --- |
| $\Delta_2$ % | 0.05 |
| $\Delta_3$ % | 0.5 |
| $r_1$ µm | 2.5 |
| $r_3$ µm | 5.5 |
| w µm (outermost annular segment) | 1 |

The average property values of a large number of waveguide fibers made using the parameters of Table 1 as target were:

attenuation at 1550 nm–0.204 dB/km;

mode field diameter–9.29 µm;

effective area at 1550 nm–70.9 µm$^2$;

zero dispersion wavelength–1576 nm;

total dispersion at 1530 nm–(–5.565 ps/nm-km);

total dispersion at 1560 nm–(–1.892 ps/nm-km);

cut off wavelength–1429.6 nm in cabled form; and, polarization mode dispersion–0.037 ps/(km)$^{1/2}$.

Thus the manufacturing results provide a waveguide fiber suitable in every respect for use in severe environments such as undersea telecommunications cables. The manufacturing results also serve to validate the computer model.

Although particular embodiments of the invention have been herein disclosed and described, the invention is nonetheless limited only by the following claims.

We claim:

1. A single mode optical waveguide fiber comprising:

a segmented core having at least two segments, each of the segments having a radius $r_i$, a refractive index profile and a relative refractive index percent, $\Delta_i$ %, where i is equal to the number of segments, and a clad layer surrounding and in contact with the core, the clad layer having a refractive index $n_c$;

wherein, the $\Delta_i$ % are positive and the $r_i$, $\Delta_i$ %, and the refractive index profiles are selected to provide:

attenuation at 1550 nm no greater than 0.25 dB/km;

zero dispersion wavelength in the range of about 1565 nm to 1600 nm;

total dispersion at 1560 nm in the range of about –3.5 to –0.5 ps/nm-km;

effective area>60 µm$^2$ at 1550 nm; and, cut off wavelength of fiber in cabled form in the range of about 1285 nm to 1500 nm.

2. The single mode optical fiber of claim 1 wherein the refractive index profile of any of the segments is selected from the group consisting of an α-profile, a step index profile, a step index profile having rounded corners, and a trapezoidal index profile.

3. The single mode optical fiber of claim 2 wherein the core has a centerline and at least three segments, a first segment beginning at about the centerline and having an α-profile with an α value of about 1, a second segment adjoining the first segment and having a step index profile, and a third segment adjoining the second segment and having a rounded step index profile.

4. The single mode optical fiber of claim 3 wherein the core comprises three segments, wherein the first segment has a $\Delta_1$ % in the range of about 0.75 to 1.25, a radius $r_1$ in the range of about 1.5 to 4.0 µm, the second segment has a $\Delta_2$ % in the range of about 0.00 to 0.15%, and the third segment has a $\Delta_3$ % in the range of about 0.2 to 0.7, a mid point radius $r_3$ in the range of about 4 to 8 µm, and a width in the range of about 0.5 to 3 µm.

5. The single mode optical fiber of claim 3 wherein the core comprises three segments, wherein the first segment has a $\Delta_1$ % in the range of about 0.85 to 1.20, a radius $r_1$ in the range of about 2.0 to 3.5 µm, the second segment has a $\Delta_2$ % in the range of about 0.00 to 0.08 %, and the third segment has a $\Delta_3$ % in the range of about 0.3 to 0.7, a mid point radius $r_3$ in the range of about 5 to 7.5 µm, and a width in the range of about 0.8 to 2.0 µm.

6. The single mode optical fiber of claim 3 wherein the core comprises three segments, wherein the first segment has a $\Delta_1$ % in the range of about 0.95 to 1.15, a radius $r_1$ in the range of about 2.5 to 3.0 µm, the second segment has a $\Delta_2$ % in the range of about 0.00 to 0.04%, and the third segment has a $\Delta_3$ % in the range of about 0.3 to 0.7, a mid point radius $r_3$ in the range of about 5 to 7.5 µm, and a width in the range of about 0.8 to 1.5 µm.

7. The single mode optical fiber of any one of claims 4, 5, or 6 further including a relative index indentation on centerline, the indentation having the shape of an inverted cone the relative index of the indentation having a minimum value not less than about 0.2 of $\Delta_1$ % and the radius of the base of the inverted cone being no greater than about 0.4 µm.

8. The single mode optical fiber of claim 1 or 2 in which the total dispersion at 1560 nm is more negative than −1 ps/nm-km.

9. A telecommunication system comprising:
an optical waveguide fiber made in accord with claim 1.

10. The telecommunication system of claim 9 wherein the system operating wavelength is lower attenuation operating range around 1550 nm.

11. A single mode optical waveguide fiber comprising:
a segmented core having at least two segments, each of the segments having a radius $r_i$, a refractive index profile and a relative refractive index percent, $\Delta_i$ %, where i is equal to the number of segments;
and a clad layer surrounding and in contact with the core, the clad layer having a refractive index $n_c$;
wherein, the $r_i$, $\Delta_i$ %, and the refractive index profiles are selected to provide:
attenuation at 1550 nm no greater than 0.25 dB/km;
zero dispersion wavelength in the range of about 1565 nm to 1600 nm;
total dispersion at 1560 nm in the range of about −3.5 to −0.5 ps/nm-km;
effective area>60 µm² at 1550 nm;
polarization mode dispersion is no greater than about 0.08 ps/(km)^{1/2}; and,
cut off wavelength of fiber in cabled form in the range of about 1285 nm to 1500 nm.

12. The single mode optical fiber of claim 11 wherein the refractive index profile of any of the segments is selected from the group consisting of an α-profile, a step index profile, a step index profile having rounded corners, and a trapezoidal index profile.

13. The single mode optical fiber of claim 11 or 12 wherein all of the $\Delta_i$ % are positive.

14. The single mode optical fiber of claim 11 wherein the core has a centerline and at least three segments, a first segment beginning at about the centerline and having an α-profile with an α value of about 1, a second segment adjoining the first segment and having a step index profile, and a third segment adjoining the second segment and having a rounded step index profile.

15. The single mode optical fiber of claim 11 or 14 wherein the core comprises three segments, wherein the first segment has a $\Delta_1$ % in the range of about 0.75 to 1.25, a radius $r_1$ in the range of about 1.5 to 4.0 µm, the second segment has a $\Delta_2$ % in the range of about 0.00 to 0.15%, and the third segment has a $\Delta_3$ % in the range of about 0.2 to 0.7, a mid point radius $r_3$ in the range of about 4 to 8 µm, and a width in the range of about 0.5 to 3 µm.

16. The single mode optical fiber of claim 11 or 14 wherein the core comprises three segments, wherein the first segment has a $\Delta_1$ % in the range of about 0.85 to 1.20, a radius $r_1$ in the range of about 2.0 to 3.5 µm, the second segment has a $\Delta_2$ % in the range of about 0.00 to 0.08%, and the third segment has a $\Delta_3$ % in the range of about 0.3 to 0.7, a mid point radius $r_3$ in the range of about 5 to 7.5 µm, and a width in the range of about 0.8 to 2.0 µm.

17. The single mode optical fiber of claim 11 or 14 wherein the core comprises three segments, wherein the first segment has a $\Delta_1$ % in the range of about 0.95 to 1.15, a radius $r_1$ in the range of about 2.5 to 3.0 µm, the second segment has a $\Delta_2$ % in the range of about 0.00 to 0.04%, and the third segment has a $\Delta_3$ % in the range of about 0.3 to 0.7, a mid point radius $r_3$ in the range of about 5 to 7.5 µm, and a width in the range of about 0.8 to 1.5 µm.

18. The single mode optical fiber of claim 15 further including a relative index indentation on centerline, the indentation having the shape of an inverted cone being no more than about 0.20 Δ % less than $\Delta_1$ %, and the radius of the base of the inverted cone being no greater than about 0.4 µm.

19. The single mode optical fiber of claim 16 further including a relative index indentation on centerline, the indentation having the shape of an inverted cone being no more than about 0.20 Δ % less than $\Delta_1$ %, and the radius of the base of the inverted cone being no greater than about 0.4 µm.

20. The single mode optical fiber of claim 17 further including a relative index indentation on centerline, the indentation having the shape of an inverted cone being no more than about 0.20 Δ % less than $\Delta_1$ %, and the radius of the base of the inverted cone being no greater than about 0.4 µm.

21. The single mode optical fiber of claim 11 in which the total dispersion at 1560 nm is more negative than −1 ps/nm-km.

* * * * *